(12) United States Patent
Jacobbi

(10) Patent No.: US 6,224,928 B1
(45) Date of Patent: May 1, 2001

(54) METHOD FOR MAKING SANDWICHES

(76) Inventor: Jeffrey J. Jacobbi, 6 Forestal Dr., Hamburg, NY (US) 14075

( * ) Notice: Subject to any disclaimer, the term of this patent is extended or adjusted under 35 U.S.C. 154(b) by 0 days.

(21) Appl. No.: 09/520,397

(22) Filed: Mar. 8, 2000

Related U.S. Application Data

(60) Provisional application No. 60/123,334, filed on Mar. 8, 1999.

(51) Int. Cl.$^7$ ..................................................... A21D 13/00
(52) U.S. Cl. ........................... 426/275; 426/93; 426/518; 99/430; 99/439; 99/537
(58) Field of Search .............................. 426/93, 275, 496, 426/518; 99/430, 439, 537

(56) References Cited

U.S. PATENT DOCUMENTS

| | | | |
|---|---|---|---|
| D. 315,275 | * 3/1991 | Aziz et al. ............................. | D7/673 |
| D. 343,770 | * 2/1994 | McFarling et al. .................... | D7/673 |
| 1,807,189 | 5/1931 | Bemis . | |
| 1,873,920 | 8/1932 | Bemis . | |
| 2,057,250 | 10/1936 | Sanger . | |
| 2,277,888 | 3/1942 | Segal . | |
| 2,925,110 | 2/1960 | Bayers . | |
| 3,539,354 | * 11/1970 | Colvin ................................... | 426/275 |
| 3,994,213 | 11/1976 | Brezinski . | |
| 4,807,505 | * 2/1989 | Campbell et al. ..................... | 83/454 |
| 5,499,578 | 3/1996 | Payne . | |
| 5,567,455 | 10/1996 | Alsbrook, Sr. . | |
| 5,832,800 | * 11/1998 | Donoghue .......................... | 83/467.1 |
| 5,903,982 | * 5/1999 | Gibson ................................. | 30/282 |
| 6,083,550 | * 7/2000 | Cochran et al. ................. | 426/275 X |

* cited by examiner

*Primary Examiner*—Milton Cano
(74) *Attorney, Agent, or Firm*—James C. Simmons

(57) ABSTRACT

An article and method of making sandwiches. The article has a floor and a pair of side walls and is open along the top and at least one end and is sized to have a floor width which is equal substantially to the width of a sandwich to be made therewith and a side wall height which is at least equal to about the height of a sandwich to be made therewith. A bread portion of a sandwich is placed on the floor and between the side walls, and additional sandwich portions are stacked on the bread portion and between the side walls whereby the side walls constrain the sandwich over its height from falling apart as it is being stacked so that sandwiches may be made faster and with greater efficiency.

7 Claims, 2 Drawing Sheets

METHOD FOR MAKING SANDWICHES

This application claims the benefit of U.S. Provisional Application Ser. No. 60/123,334, filed Mar. 8, 1999. The disclosure of this application is hereby incorporated herein by reference.

The present invention relates to the preparation of sandwiches.

Submarine and other sandwiches are typically prepared at a deli or sandwich shop by placing a bottom piece of bread or roll half on a counter-top or the like, placing meats, cheeses, lettuce, tomato slices, and other items as desired on top thereof, placing another piece of bread or roll half thereon, cutting the sandwich into two or more pieces, and wrapping it for delivery to the customer. The tendency of the sandwich fillings to fall off during the making of a sandwich in this manner can result in waste of filling material and inefficiencies due to having to keep the filling material from falling off. In addition, more effort is required to keep the counter-top clean.

U.S. Pat. No. 1,873,920 to Bemis discloses a sandwich assembling device wherein a plurality of sandwich fillings are assembled end-to-end on a trough member which has a floor, a pair of sidewalls, and open ends and top. A bun is mounted on one end of the trough member, and, by use of the member indicated at 2 in Bemis, a sandwich filling is slid into the bun. Also see U.S. Pat. No. 1,807,189 also to Bemis. This process undesirably is difficult and cumbersome, requires more than one part, and the sandwich must still be laid on a counter-top or the like for cutting thereof in half.

U.S. Pat. No. 3,994,213 to Brezinski discloses a sandwich warming and preparation pan comprising a thin rectangular metal sheet with contiguous angular corrugations open at the tops and ends and each holding a single sandwich while it is being made. At 7a thereof is illustrated top and bottom bread portions lying on the respective inclined walls of a corrugation in position to receive sandwich filling. It should be noted that the inclined walls, while serving to hold the bread, are not disclosed as serving as restraints to the filling falling off the sandwich in preparation. The sandwiches must of course undesirably be placed on a counter-top or other flat surface for cutting thereof in half.

U.S. Pat. No. 5,499,578 to Payne discloses a sausage cutter having a pair of hingedly connected parts which, when together, define a bore there through for receiving a sausage. A plurality of pairs of vertical slits are contained in the parts respectively, and a knife is inserted in a pair of the slits to cut the sausage. Members with cylindrical walls having vertical slits have been provided for receiving and cutting bagels in half.

U.S. Pat. No. 2,925,110 to Bayers discloses a knife guide which is placed over a prepared sandwich and which has crossing vertical slits therein for receiving a knife for cutting the sandwich into quarters. See also U.S. Pat. Nos. 2,277,888 to Segal and 2,057,250 to Sanger.

U.S. Pat. No. 5,567,455 to Alsbrook, Sr. discloses a method of making a salad sandwich wherein the sandwich is made of a baked edible shell that is open at one end and contains a tear-away bag that is filled with a sandwich fill. To eat the sandwich, the bag is removed from around the fill, leaving the fill in the sandwich.

The above art does not disclose an efficient and easy method for making a sandwich.

It is accordingly an object of the present invention to make a sandwich efficiently and easily.

It is another object of the present invention to also maintain the surface on which the sandwich is made clean.

It is yet another object of the present invention to provide an article for making the sandwich which is rugged, easy to use, reliable, and inexpensive to manufacture.

In order to efficiently and easily make a sandwich, in accordance with the present invention, the sandwich is stacked within an article having a floor, a pair of side walls, and an open top and open ends.

In order to allow the sandwich to be cut into parts after it is stacked without removing it from the article, the article has at least one pair of vertical slots in its walls respectively for receiving a knife blade.

The above and other objects, features, and advantages of the present invention will be apparent in the following detailed description of a preferred embodiment thereof when read in conjunction with the accompanying drawings wherein the same reference numerals depict the same or similar parts throughout the several views.

DETAILED DESCRIPTION OF THE PREFERRED EMBODIMENT

Figure 1:
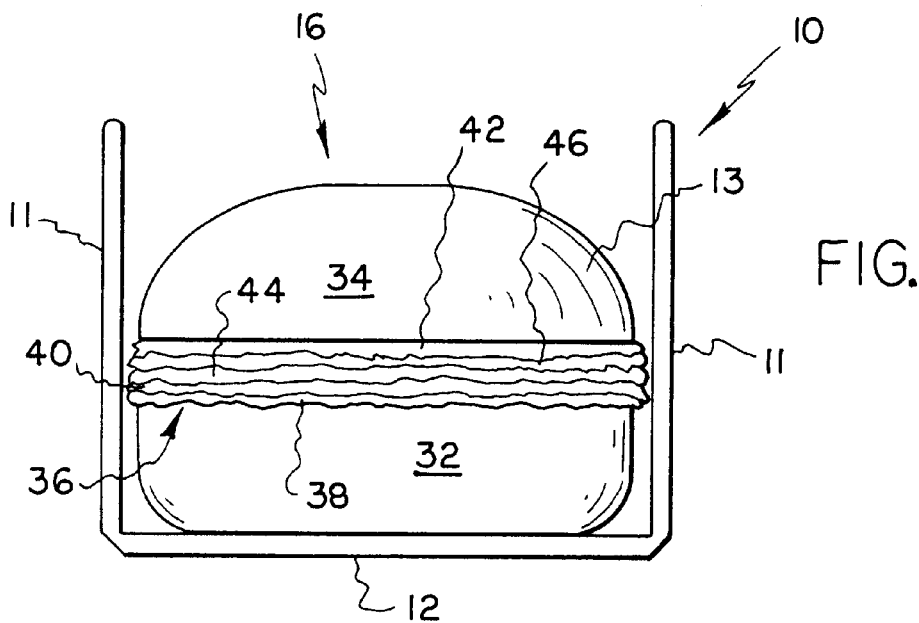
FIG. 1 is a generally schematic view of the end of an article which embodies the present invention, illustrating the stacking of a sandwich therein.

Referring to the drawings, there is shown generally at 10 an article made of plastic or other suitable material and having a floor 12 and a pair of side walls 11. The top and ends, illustrated at 16 and 18 respectively, of the article 10 are shown to be left open, i.e., the article 10 has no top wall or end walls connecting the side walls. The article 10 is preferably of one-piece construction so as to avoid cracks in which food particles could unsanitarily collect. The bottom corners may be chamfered, as illustrated at 20, and the upper corners 22 may be rounded.

Figure 4:
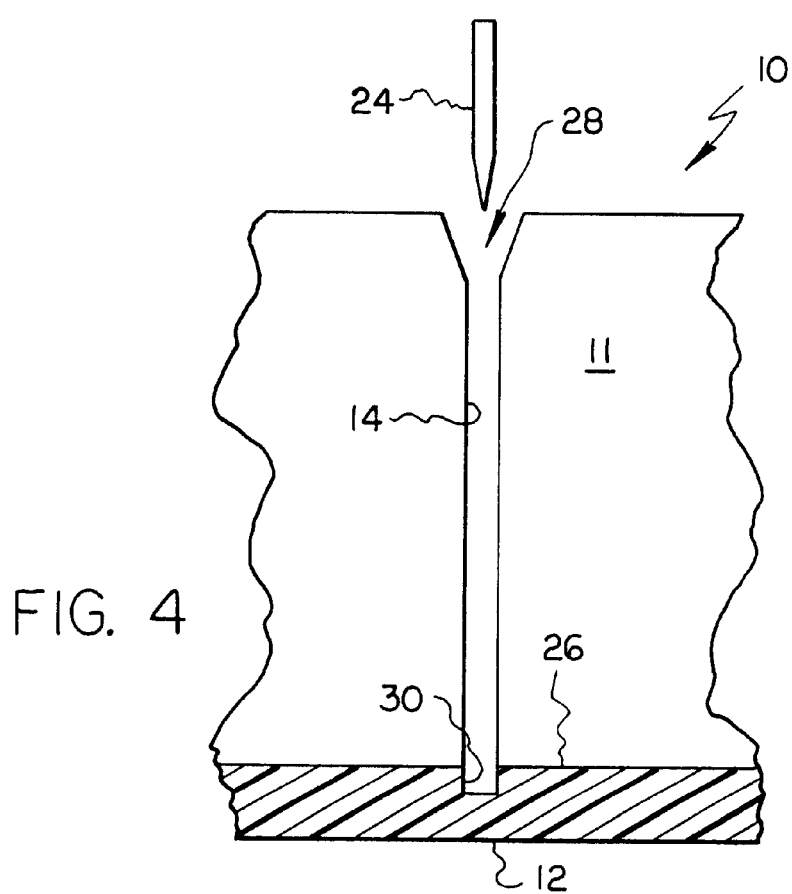
FIG. 4 is a sectional view thereof taken along lines 4–4 of FIG. 2.

A pair of slits, illustrated at 14, are provided in the side walls 11 respectively for receiving the blade 24 of a knife 15. Each slit 14 extends throughout the entire height of the side wall 11 and terminates slightly below the upper surface 26 of the floor 12. Each slit 14 opens at the upper edge of the respective side wall 11. The upper slit opening, illustrated at 28, has an increased width to allow easy insertion of the blade 24. Thus, the sides of the 14 may be tapered near the opening 28 as illustrated in FIG. 4. The floor 12 has a groove, illustrated at 30, therein which extends between the pair of slits 14 for receiving the knife blade 24. The bottom of the groove 30 is at the depth of the bottoms of the slits 14, and the groove width is generally equal to the slit width.

The article 10 is sized to receive a sandwich 13 which is illustrated to be a submarine sandwich. The following example of the sizes of article 10 for making a submarine sandwich is for exemplary purposes only and not for purposes of limitation. For example, the article 10 may have a length of about 14 inches, a height of about 3⅛ inches, a width of about 3⅞ inches, and a side wall and floor thickness of about ⅜ inch (leaving an interior wall height of about 2¾ inches and an interior floor width of about 3⅛ inches). The slits 14 and groove 30 may, for example, have a width of about ⅛ inch with the opening 28 having a width of about ¼ inch, and the groove 30 may have a depth of about ¹⁄₁₆ inch. Each of the slits 14 is located midway between the article ends.

It should be understood that the present invention is meant to cover the making of various sizes and shapes of sandwiches, and, therefore, the article 10 should be sized and shaped for the particular size and shape of sandwich to be made. More than a single pair of slits 14 may be placed in the side walls so that the sandwich may be cut into more than two parts. In order that the sandwich 13 may be cut at a slant, one of the slits 14 may be located closer than the other slit to an article end.

The sandwich 13 comprises a piece of french bread or the like which has been sliced length-wise to provide a bottom bread portion 32 and a top bread portion 34 of the sandwich. A sandwich filling, illustrated at 36, is provided between the bread portions 32 and 34. The filling 36 may comprise, for example, meats 38, cheeses 40, lettuce 42, tomato slices 44, onion slices 46, and desired condiments.

In order to make the sandwich, in accordance with the present invention, the bread portion 32 is placed on the floor 12 between the side walls 11, the open top 16 allowing one to easily place the bread portion 32 (as well as the sandwich filling parts and the top bread portion 34) therein. The parts of the filling 36 are then layered on top of the bottom bread portion 32 and each other, as illustrated in FIG. 1, with the side walls 11 preventing the filling parts from falling off and onto the counter top thereby keeping the counter top clean and preventing waste from occurring when filling parts falling onto the counter top would be thrown away. Since the sandwich maker need no longer exercise care to keep the filling parts from falling off, the sandwich 13 may be made faster for greater efficiency. Finally, the top bread portion 34 is placed on top of the filling 36 with the side walls being high enough to also prevent it from falling off. Thus, the sandwich may be quickly and efficiently stacked without fear of it falling apart and the resultant waste and soiling of the counter top.

Figure 2:
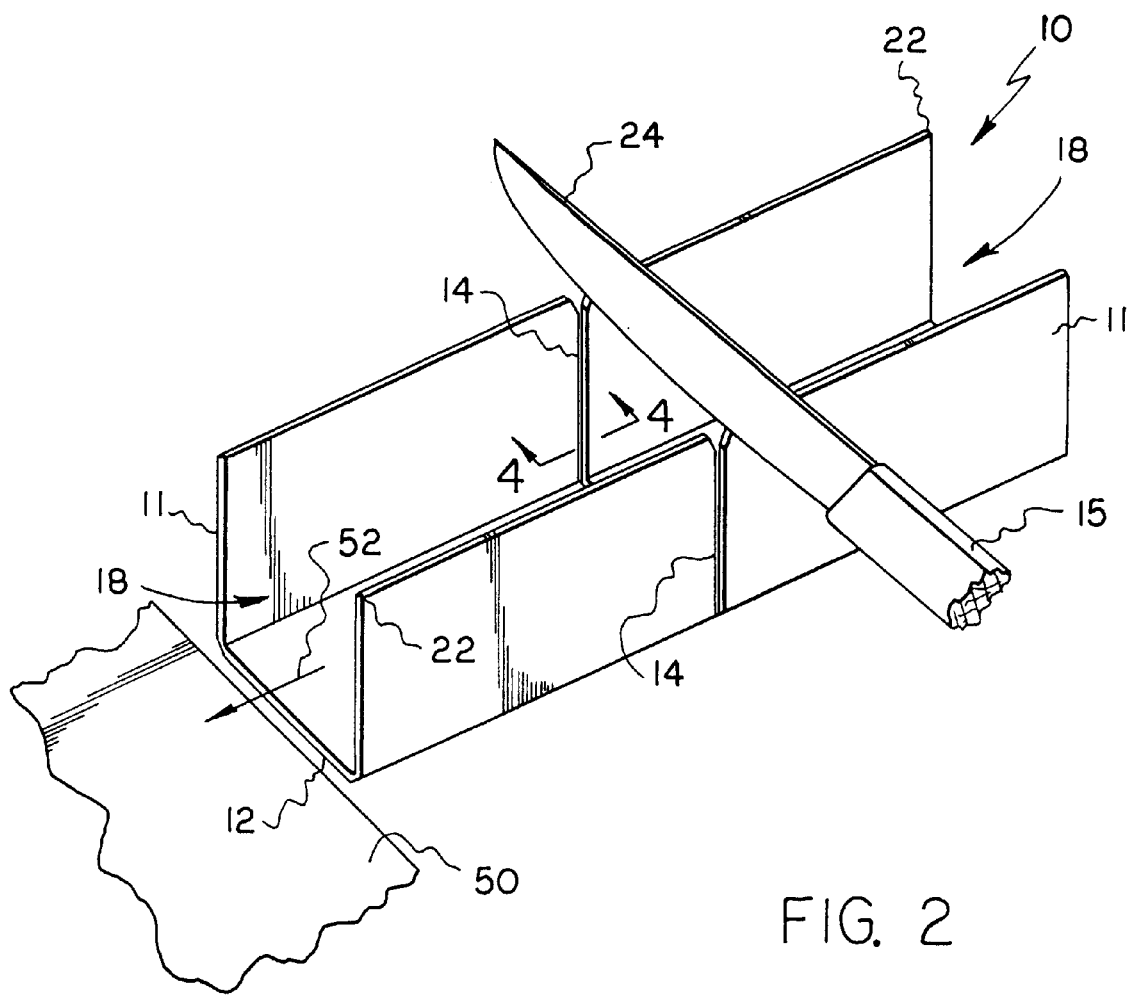
FIG. 2 is a perspective schematic view thereof, with the sandwich not shown for ease of illustration, and illustrating the cutting of the sandwich in half.
Figure 3:
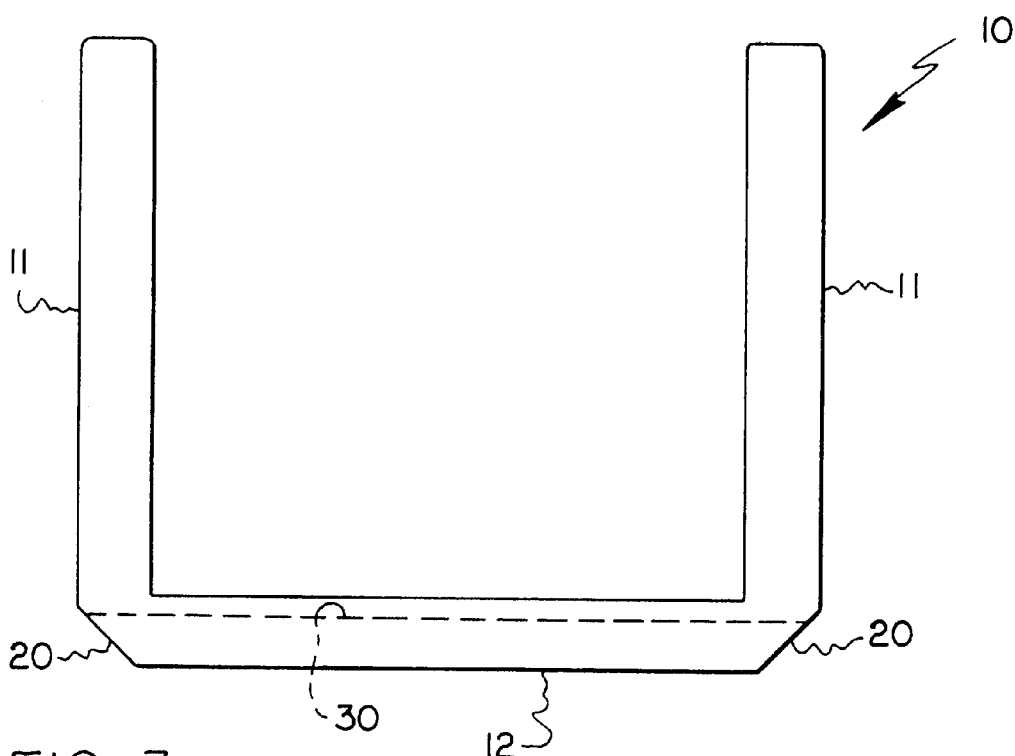
FIG. 3 is an end view thereof, with the sandwich not shown for ease of illustration.

Referring to FIG. 2, the sandwich is cut in half without the necessity of removing it from the article 10. Thus, with the stacked sandwich 13 still in the article, the knife blade 24 is inserted in wide openings 26 and downwardly in both slits 14 slicing through the sandwich 13 with the side walls still constraining the sandwich parts and thus preventing the sandwich from falling apart during the cutting thereof in half, thereby providing additional efficiency and speed of sandwich preparation. The blade is allowed to penetrate below the top of the floor 12, i.e., into the groove 30 to thereby allow a clean cut of the bottom bread portion 32. If desired, toothpicks or the like may be inserted in the sandwich parts, as is customary for holding them together.

Since the sandwich maker need no longer exercise care against the sandwich 13 falling apart even while preparing to wrap it after it is cut, the sandwich maker can grab the wrapping paper, a portion of which is illustrated at 50, with one hand and place it adjacent one end of the article 10 while at the same time sliding the sandwich out with the other hand onto the wrapping paper, as illustrated by the arrow 52. Thus, the sandwich is slid out one end 18 of the article 10 onto the wrapping paper, with the side walls continuing to constrain the sandwich and prevent it from falling apart as it is slid onto the wrapping paper. Thus, the sandwich 13 may be more quickly wrapped after it is cut.

Thus, there is provided an inexpensive, rugged, reliable, and easy to use article and method for constraining a sandwich as it is stacked, cut, and slid onto wrapping paper for wrapping, thereby allowing a sandwich to be made more quickly and with greater efficiently and a cleaner counter top.

Although the invention has been described in detail herein, it should be understood that the invention can be embodied otherwise without departing from the principles thereof, and such other embodiments are meant to come within the scope of the present invention as defined in the appended claims.

I claim:

1. A method of making a sandwich comprising (a) providing an article having a floor and a pair of side walls and open along the top and at least one open end and sized to have a floor width which is equal substantially to the width of a sandwich to be made therewith and a side wall height which is at least equal to about the height of a sandwich to be made therewith; (b) placing a bread portion of a sandwich on the floor and between the side walls; (c) stacking additional sandwich portions on the bread portion and between the side walls whereby the side walls constrain the sandwich over its height from falling apart as it is being stacked: and (d) sliding the stacked sandwich out of the article.

2. The method according to claim 1 further comprising placing sandwich wrapping paper adjacent the at least one open end of the article, sliding the stacked sandwich onto the wrapping paper, and wrapping the sandwich.

3. A method of making a sandwich comprising: (a) providing an article having a floor and a pair of side walls and open along the top and at least one open end and sized to have a floor width which is equal substantially to the width of a sandwich to be made therewith and a side wall height which is at least equal to about the height of a sandwich to be made therewith; (b) placing a bread portion of a sandwich on the floor and between the side walls; (c) stacking additional sandwich portions on the bread portion and between the side walls whereby the side walls constrain the sandwich over its height from falling apart as it is being stacked; and (d) inserting a knife blade into a pair of slits in the side walls and, with the knife blade in the slits, cutting the sandwich into parts.

4. The method according to claim 3 further comprising placing sandwich wrapping paper adjacent the at least one open end of the article, sliding the stacked and cut sandwich out of the article and onto the wrapping paper, and wrapping the sandwich.

5. A method of making a sandwich comprising: (a) providing an article composed of a single piece of plastic material having a floor and a pair of side walls and open along the top and at least one open end and sized to have a floor width which is equal substantially to the width of a sandwich to be made therewith and a side wall height which is at least equal to about the height of a sandwich to be made therewith; (b) placing a bread portion of a sandwich on the floor and between the side walls; (c) stacking additional sandwich portions on the bread portion and between the side walls whereby the side walls constrain the sandwich over its height from falling apart as it is being stacked; and (d) sliding the stacked sandwich out of the article.

6. The method according to claim 5 further comprising inserting a knife blade into a pair of slits in the side walls and, with the knife blade in the slits, cutting the sandwich into parts.

7. The method according to claim 5 further comprising placing sandwich wrapping paper adjacent the at least one open end of the article, sliding the stacked and cut sandwich out of the article and onto the wrapping paper, and wrapping the sandwich.

* * * * *